Figure 1:
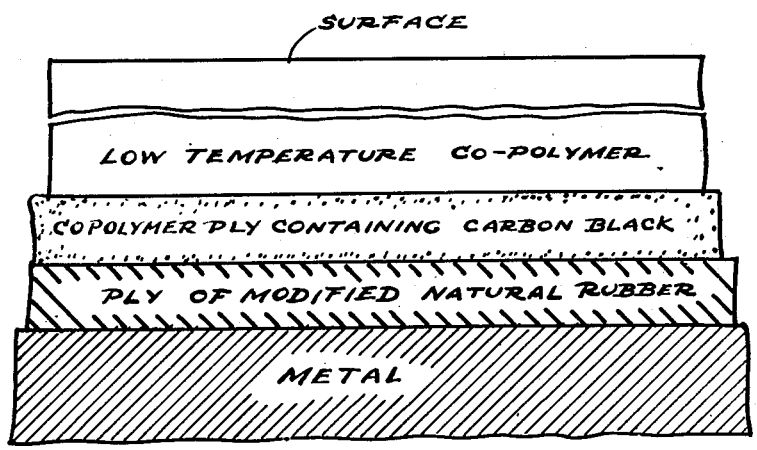

May 10, 1949.    F. P. BALDWIN    2,469,710
LAMINATING BY MEANS OF AN ISOOLEFIN-DIOLEFIN
INTERPOLYMER TIE PLY
Filed Jan. 5, 1943

Francis P. Baldwin Inventor
By P. L. Young Attorney

Patented May 10, 1949

2,469,710

UNITED STATES PATENT OFFICE 2,469,710

LAMINATING BY MEANS OF AN ISOOLEFIN-DIOLEFIN INTERPOLYMER TIE PLY

Francis P. Baldwin, Pluckemin, N. J., assignor to Standard Oil Development Company, a corporation of Delaware Application January 5, 1943, Serial No. 471,369

14 Claims. (Cl. 154—130)

This invention relates to the plying together, or adhesion, of synthetic isoolefin-diolefin interpolymers with bodies of other rubber-like materials; relates especially to the adhering together of an isoolefin-diolefin interpolymer having a heavy loading of carbon black; and relates particularly to the attaching of an isoolefin-diolefin interpolymer having a heavy loading of carbon black to a metal body through the agency of a tie ply which is adherent to the metal; and to the joining of an isoolefin-diolefin interpolymer to modified rubber cements.

In the preparation of composite rubbery articles having a portion thereof composed of an isoolefin-diolefin low temperature interpolymer, and another portion thereof composed of some other rubber-like material, or of a metal or other solid body, very great difficulty is encountered in plying together layers of the interpolymer with layers of natural rubber or metal since the two materials do not adhere, and when intermixtures of the two are prepared in an attempt to find something to which both will adhere, the mixture shows such an extremely low tensile strength that the adhesion between plies of the two materials is either negligible or too low in strength to be satisfactory.

The present invention utilizes a tie ply consisting of polymer containing from 100 parts to 225 of carbon black per 100 parts of polymer positioned between the body of interpolymer and a modified rubber tie cement, which cement is adherent to another body such as metal or rubber or the like. This mixture has adequate physical strength, adequate elongation and shows adequate cohesion to both the tie cement and the polymer.

The adhesion appears to be due to the fact that while the particles of carbon black are not wetted by the polymer they are firmly held by mechanical interlocking; and the further fact that tie cements wet the particles of carbon black and adhere firmly thereto. Accordingly, at the interface between the carbon black loaded polymer and the tie cement, there are particles of carbon black to which the tie cement adheres firmly because it wets the particles, and to which the polymer is firmly attached by a mechanical interlocking which serves to give a fully adequate cohesion between the two layers.

Thus, an object of the invention is to ply together layers of natural rubber or emulsion olefinic polymer or metal and an isoolefin-diolefin low temperature interpolymer through the intermediary of a heavy loading of carbon black in a tie ply of the polymer. Other objects and details of the invention will be apparent from the following description.

Figure 2:
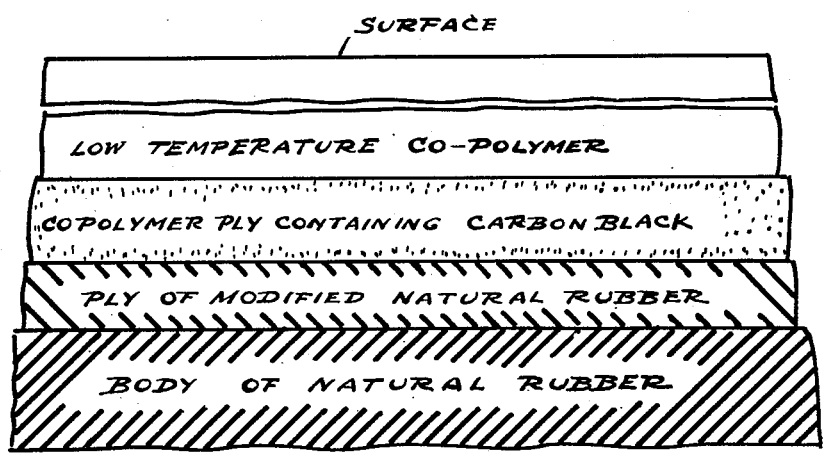

In the drawing, Figure 1 is a diagrammatic sectional view showing the present invention as applied to a base or body of metal, and Figure 2 is a view similar to Figure 1 showing the invention as applied to a base or body of natural rubber.

In practicing the invention, a basic material is the low temperature interpolymer of an isoolefin with a diolefin. In preparing this interpolymer an isoolefin of from 4 to 8 carbon atoms, preferably isobutylene, is cooled below its liquefaction temperature and mixed with a polyolefin also cooled below its liquefaction temperature. The polyolefin may be butadiene, isoprene, piperylene or a substituted butadiene having up to about 12 carbon atoms per molecule, such as dimethyl butadiene or 2-methyl hexadiene-1,5; or may be a non-conjugated diolefin such as dimethallyl or a triolefin such as myrcene, hexatriene or any other polyolefin or homolog thereof of 4 to 12 carbon atoms and capable of interpolymerization with an isoolefin such as isobutylene. The mixed olefins are preferably cooled to temperatures below about −40° C. down to about −160° C. and the mixture, with or without a diluent, such as liquid ethylene or ethyl chloride or liquid propane or carbon disulfide, is polymerized by the application to the rapidly stirred olefinic mixture of a dissolved Friedel-Crafts type catalyst, preferably aluminum chloride in solution in ethyl or methyl chloride or carbon disulfide.

The list of available Friedel-Crafts type catalysts is well shown by N. O. Calloway in his article on "The Friedel-Crafts Synthesis" printed in the issue of "Chemical Reviews" published for the American Chemical Society at Baltimore in 1935 in Volume XVII, No. 3, the article beginning on page 327, the list being particularly well shown on page 375.

For the solvent, substantially any of the lower alkyl halides up to and including 3 or 4 carbon atoms per molecule may be used as well as several of the oxygen-free substituted hydrocarbons. The preferred proportion of the mixture is a major proportion of the isoolefin and a minor proportion of the diolefin; from 70% to 99.5% of the isoolefin with 30% to 0.5% of the diolefin being the most useful range of proportions.

For the immediate purposes of the invention, this polymer having a molecular weight ranging from 20,000 to 150,000 and an iodine number ranging from 0.5 to 40 or 50 is compounded with appropriate compounding agents, such as zinc oxide, in the ratio of 1 to 10 parts per 100 of polymer; stearic acid from 1 to 8 parts per 100 of polymer; sulfur from 1 to 4 parts per 100 of polymer; a sulfurization aid from 0.25 to 3 parts per 100 of polymer; and carbon black from 100 to 225 parts per 100 of polymer. This mixture is readily prepared upon the open roll mill and can be sheeted out into a thin tie ply or made into a cement. This ply or cement is then interposed between a body of the polymer compounded according to any desired recipe, and a tie cement on natural rubber compounded according to any desired recipe, or modified natural rubber compounded as desired. The assemblage is then cured to yield a strong unitary body of the several materials.

The tie cement on the natural rubber preferably is a modified natural rubber such as sulfonated rubber of the type sold under the trade names of Vulcalock, or Naugatuck E. F. G.; or chlorinated rubber such as Bostick M35, or cyclicized rubber such as Ty Ply, or the like. Accordingly, the composite article may consist of four layers or laminae, the first of which may be a metal or other solid body, to which the modified rubber layer or film is adherent; to which in turn the polymer containing the heavy loading of carbon black is adherent, with the main body of polymer adherent to the layer or lamina or film of heavily loaded polymer.

Example 1

A sample of isobutylene-isoprene interpolymer prepared as above described was compounded according to the following recipe:

| | Parts by weight |
|---|---|
| Polymer | 100.0 |
| Zinc oxide | 5.0 |
| Stearic acid | 3.0 |
| Sulfur | 2.0 |
| Tuads (tetramethylthiuram disulfide) | 1.0 |
| Gastex [1] | 100.0 |
| Kosmobile "66" [1] | 50.0 |

[1] Carbon black.
(In the above table, "Gastex" is a semi-reinforcing furnace black, and "Kosmobile '66'" is a medium processing channel black.)

Simultaneously, a metal strip was carefully cleaned to free it of dirt and grease, and it was then given a coating of a common tie cement, such as "Vulcalock." This material is a sulfonated rubber as above pointed out. A layer of the compounded polymer was then laid down upon the Vulcalock and the assembly cured for 60 minutes at a temperature of 307° F.

The cured material required a pull of 29 pounds to separate the polymer layer from the coated metal.

This example shows the good adhesion between the modified rubber tie cement and the heavily loaded polymer. For a complete article, a top layer of the polymer, preferably with a smaller amount of carbon black loading is used. This final layer may have any desired fillers and may be compounded in general according to the recipe above given except that the carbon black loading preferably lies within the range from 25 parts to about 100 parts of total carbon black.

Example 2

A sample of isobutylene-isoprene interpolymer prepared as above described was compounded according to the following recipe:

| | Parts by weight |
|---|---|
| Polymer | 100.0 |
| Zinc oxide | 5.0 |
| Stearic acid | 3.0 |
| Sulfur | 2.0 |
| Tuads | 1.0 |
| P-33 [1] | 100.0 |
| Kosmobile "66" [1] | 50.0 |

[1] Carbon black.
(In the above table, the "Tuads" is tetramethyl thiuram disulfide; the "P-33" is a fine particle thermal carbon black; and the "Kosmobile '66'" is a medium processing channel black.)

and simultaneously a strip of sheet steel was cleaned and coated with Vulcalock as in Example 1. A layer of the compounded polymer was applied to the coated steel strip and the assemblage cured for 60 minutes at a temperature of 307° F. A pull of 46 pounds was required to separate the polymer from the coated metal.

This test of the amount of pull required to separate the polymer from the steel strip is known as "ASTM Designation D-413-39" and utilizes a strip approximately 6" long and accurately 1" wide so that the pull required to separate the polymer from the strip is the strength of the polymer on a line exactly 1" long.

Example 3

Another sample of the polymer prepared as above described utilizing isobutylene with dimethyl butadiene was prepared and compounded according to the following recipe:

| | Parts by weight |
|---|---|
| Polymer | 100.0 |
| Sulfur | 2.0 |
| ZnO | 5.0 |
| Stearic acid | 3.0 |
| Kosmobile 66 | 50.0 |
| P-33 | 100.0 |
| Tuads | 1.0 |

(In the above table, "Kosmobile '66'" is a medium processing channel black; "P-33" is a fine thermal black; and "Tuads" is tetramethyl thiuram disulfide.)

This material was attached to a series of four steel test strips in the manner analogous to that in Example 1 using a variety of modified rubber materials. Table I shows the pull required to separate the polymer from the steel strip.

Table I

| Sample | Tie Cement | Lbs. Pull |
|---|---|---|
| 1 | Vulcalock | 52 |
| 2 | Bostik M-35 | 45-55 |
| 3 | Bostik M-162 | 28-35 |
| 4 | Bostik M-35 | 52-55 |

This method of procedure is not limited to the adhering of the polymer to metal or the like but is equally applicable to the adhering of the polymer to many other things.

The above-mentioned Vulcalock is a solution of sulfonated rubber in light naphtha. The several Bostik cements are solutions in light naphtha of chlorinated rubber, the several forms having different amounts of chlorine and different molecular weights present.

Example 4

A tire carcass was prepared utilizing natural rubber with cotton cord fabric to provide the necessary strength. To this carcass there was then applied a layer of the polymer prepared according to the recipe in Example 1. Simultaneously a tread was prepared from the polymer compounded with a smaller amount of carbon black, approximately 50 parts of carbon black per 100 of polymer being used. The tread was then given a partial cure, and applied to the natural rubber carcass with the layer of compounded polymer. The assemblage was then given a final cure to complete the tire, resulting in a very durable, well-made tire having a natural rubber carcass and a polymer tread.

This procedure is particularly applicable for applying polymer recaps to worn natural rubber tires.

For this purpose the tie ply may be sheeted out and used in the form of a relatively thin sheet of solid polymer, or the composition shown in the recipe in Example 1 may be dissolved in approximately 500 parts of petroleum naphtha solvent per 100 parts of polymer present and the natural rubber carcass may be given a layer of this "cement," after which the polymer tread, with or without a preliminary "set cure" may be applied and the whole assemblage cured in the normal fashion.

The procedure is equally applicable for the adhering of the polymer to any resinous material which will adhere to carbon black, or, by the use of a cement layer of natural rubber, to any material to which the interposed layer of natural rubber will adhere.

Example 5

A series of samples was prepared using a plurality of compounds prepared according to the following recipes:

| Compound Number | 1 | 2 |
|---|---|---|
| Polymer with 1.45% isoprene | | 100.0 |
| Polymer with 4% dimethyl butadiene | 100.0 | |
| Zinc Oxide | 5.0 | 5.0 |
| Stearic Acid | 3.0 | 3.0 |
| Sulfur | 2.0 | 1.5 |
| P-33 [1] | 100.0 | |
| Kosmobile "66" [1] | 50.0 | |
| Gastex [1] | | 50.0 |
| Tuads (tetramethylthiuram disulfide) | 1.0 | 1.0 |

[1] Carbon black.

(In this compound, the "P-33" is a fine thermal black; the "Kosmobile '66'," is a medium processing channel black; and the "Gastex" is a semi-reinforcing furnace black.)

These recipes were prepared by placing on the roll mill the indicated amount of the polymer which, as above pointed out, is a low temperature interpolymer of isobutylene with a diolefin, in the present instance one polymer containing 1.45% of isoprene, and the other polymer containing 4% of dimethyl butadiene, and thereafter milling into the polymer the additional components indicated in the recipe. Test panels, according to the above mentioned ASTM designation, were then prepared by cleaning the metal panel carefully and applying to the respective panels coatings of the modified rubber cements as indicated in the following table:

| Panel Preparation | Stock | Cure | Adhesion, lbs. per inch |
|---|---|---|---|
| Vulcalock | 1 | 30'/307° F. | 52 |
| Bostick M35 | | | 52 |
| Bostick M162 | | | 52 |
| Ty Ply S | | | 19 |
| Reanite A | | | 22 |
| Reanite B | | | 45 |
| Bostick M35 | | | 30 |
| Bostick M162 | | | |

(In the above table, the "Vulcalock" is a sulfonated rubber; the two "Bosticks" are chlorinated rubber; the "Ty Ply S" is a cyclicized natural rubber; and the two "Reanites" are also cyclicized natural rubber.)

This table shows the excellent adhesion of the heavily loaded stock to the modified rubber cement and to the steel base.

The "Vulcalock" mentioned above is a sulfonated natural rubber composition. The "Bostick" substances are chlorinated rubber in which the "Bostick M35" is of somewhat lower chlorine content than the "Bostick M162." The exact amount of chlorine content is immaterial in the present instance. The "Ty Ply" is a cyclicized rubber. The "Reanites" also are cyclicized rubber in which the respective grades are made from slightly different grades of natural rubber. For the purposes of the present invention, these differences are, however, immaterial. These substances are representative of a considerable number of modified rubber compositions, all of which are useful in the present invention, the choice of which is determined not by any difference in the composition, but by the convenience and availability of the several substances.

Other samples were then prepared utilizing the same procedure but with a relatively heavy layer of polymer having a lower carbon black content as shown in compound No. 2 to yield the results shown in the following table:

| Panel Preparation | Cement | Stock | Cure | Adhesion, lbs. per inch |
|---|---|---|---|---|
| Vulcalock | Compound #1 | 2 | 30' at 307° F. | 47 |
| Bostick M35 | do | 2 | do | 54 |
| Bostick M35 | } do | 2 | do | 43 |
| Bostick M162 | | | | |
| Reanite A | } do | 2 | do | 38 |
| Reanite B | | | | |
| Reanite A | do | 2 | do | 35 |
| Ty Ply Q | do | 2 | do | 36 |
| E. F. G | do | 2 | do | 36 |

(In the above table, the "Vulcalock" is a sulfonated natural rubber; the "Bosticks" are chlorinated rubber; the "Reanites" are cyclicized natural rubber; the "Ty Ply Q" is a sulfonated natural rubber; and the "E. F. G." which is "Naugatuck E. F. G." is sulfonated natural rubber.)

It may be noted that in each instance these samples were cured for 30 minutes at 307° F.

Example 6

A series of compounds was prepared utilizing the isobutylene-diolefin low temperature interpolymer and natural rubber as shown in the following recipe:

| Compound Number | 1 | 2 | 3 |
|---|---|---|---|
| Polymer with 1.45% isoprene | 100.0 | | |
| Polymer with 4% dimethyl butadiene | | 100.0 | |
| Para Rubber (Smoked Sheet) | | | 100.0 |
| Zinc Oxide | 5.0 | 5.0 | 2.0 |
| Stearic Acid | 1.5 | 3.0 | 5.0 |
| Sulfur | 1.5 | 2.0 | 3.0 |
| P-33 | | 100.0 | |
| Kosmobile "66" (carbon black) | | 50.0 | |
| Gastex (carbon black) | 75.0 | | |
| Agerite Excel | | | 1.0 |
| Tuads (tetramethylthiuram disulfide) | 1.0 | 1.0 | |
| Captax | | | 1.0 |

(In the above table, the "P-33" is a fine thermal black; the "Kosmobile '66'" is a medium processing channel black; the "Gastex" is a semi-reinforcing furnace black; the "Agerite" is a polymerized trimethyl, dihydro quinoline; and the "Captax" is a mercapto benzothiazol.)

These compounds were prepared on the open roll mill in the usual manner, and test samples according to the above mentioned ASTM designation were prepared according to the following table and tested to yield the strengths shown in the last column:

| Natural Rubber Stock | First Cement Coat | Second Cement Coat | Third Cement Coat | Butyl Stock | Adhesion lbs./inch |
|---|---|---|---|---|---|
| Compound #3 (cured) | Bostick M35 | Compound #2 | None | Compound #1 | 37 |
| Do | Compound #3 | Bostick M35 | Compound #3 | do | 31 |
| Do | Vulcalock | Compound #2 | None | do | 34 |
| Do | Naugatuck E. F. G. | do | do | do | 22 |

In the above table, compounds 1, 2 and 3 are taken from the immediately preceding recipes, as shown by the columns marked 1, 2 and 3.

All assemblies cured 30 minutes at 307° F.

These results show the excellent adhesion obtained from four layer composites.

In the preparation of these composite bodies, the emulsion olefinic polymers, such as those prepared from butadiene with styrene, or from butadiene with acrylonitrile, are substantial equivalents for natural rubber.

Thus the invention provides a simple process for adhering an isoolefin-diolefin low temperature interpolymer to a wide range of other substances to which it does not of itself adhere and a new and useful structure composed of a plurality of different plies of elastic or inelastic material, one of which is a low temperature interpolymer of an isoolefin with a diolefin.

As shown in Figure 1 of the drawings annexed to this specification the invention may be applied to a metallic surface. For example, a metal base or body has applied thereto a first ply or layer, of appropriate thickness, of a modified natural rubber. Superimposed on the modified natural rubber layer is a co-polymer ply or layer containing carbon black as described above. A layer of low temperature co-polymer is secured to the co-polymer which contains carbon black, the latter affording good adhesion. In Figure 2 the same invention is shown as applied to a base or body of natural rubber. Here again there is applied first a ply of modified natural rubber, then a co-polymer ply or layer containing carbon black and a low temperature co-ploymer layer is secured to the layer containing the carbon black.

While there are above disclosed but a limited number of embodiments of the invention, it is possible to produce still other embodiments without departing from the inventive concept herein disclosed and it is therefore desired that only such limitations be imposed upon the appended claims as are stated therein.

The invention claimed is:

1. An article of manufacture comprising a body of a low temperature interpolymer of a major proportion of isobutylene with a minor proportion of a polyolefin having 4 to 12, inclusive, carbon atoms per molecule, the polymer being characterized by a low unsaturation within the range of an iodine number between 0.5 and 50, a molecular weight above 15,000, and reactivity with sulfur to yield an elastic product having therein an amount of carbon black less than 100 parts per 100 of polymer, a layer of the same polymer, adherent thereto comprising a member composed of the same polymer having therein an amount of carbon black within the range of 100 parts to 225 parts per 100 parts of polymer in which the carbon black is mechanically held and a layer of modified natural rubber adherent to the carbon black particles in said second layer.

2. An article of manufacture comprising a body of a low temperature interpolymer of a major proportion of isobutylene with a minor proportion of a polyolefin having 4 to 12, inclusive, carbon atoms per molecule, the polymer being characterized by a low unsaturation within the range of an iodine number between 0.5 and 50, a molecular weight above 15,000, and reactivity with sulfur to yield an elastic product having therein an amount of carbon black less than 100 parts per 100 of polymer, a layer of the same polymer adherent thereto comprising a member composed of the same polymer having therein an amount of carbon black within the range of 100 parts to 225 parts per 100 parts of polymer in which the carbon black is mechanically held and a layer of modified natural rubber adherent to the carbon black particles in said second layer and a body to which the said modified rubber layer is also adherent.

3. An article of manufacture comprising a body of a low temperature interpolymer of a major proportion of isobutylene with a minor proportion of a polyolefin having 4 to 12, inclusive, carbon atoms per molecule, the polymer being characterized by a low unsaturation within the range of an iodine number between 0.5 and 50, a molecular weight above 15,000, and reactivity with sulfur to yield an elastic product having therein an amount of carbon black less than 100 parts per 100 of polymer, a layer of the same polymer, adherent thereto comprising a polymer member having therein an amount of carbon black within the range of 100 parts to 225 parts per 100 parts of polymer in which the carbon black is mechanically held and a layer of modified natural rubber adherent to the carbon black particles in said second layer, and a body to which the said modified rubber layer is also adherent comprising a metal.

4. An article of manufacture comprising a body of a low temperature interpolymer of a major proportion of isobutylene with a minor proportion of a polyolefin having 4 to 12, inclusive, carbon atoms per molecule, the polymer being characterized by a low unsaturation within the range of an iodine number between 0.5 and 50, a molecular weight above 15,000, and reactivity with sulfur to yield an elastic product having therein an amount of carbon black less than 100 parts per 100 of polymer, a layer of the same polymer, adherent thereto comprising a polymer member having therein an amount of carbon black within the range of 100 parts to 225 parts per 100 parts of polymer in which the carbon black is mechanically held and a layer of modified natural rubber adherent to the carbon black particles in said second layer, and a body to which the said modified rubber layer is also adherent comprising natural rubber.

5. An article of manufacture comprising a body of a low temperature interpolymer of a major proportion of isobutylene with a minor proportion of a polyolefin having 4 to 12, inclusive, carbon atoms per molecule, the polymer being characterized by a low unsaturation within the range of an iodine number between 0.5 and 50, a molecular weight above 15,000, and reactivity with sulfur to yield an elastic product having therein an amount of carbon black less than 100 parts per 100 of polymer, a layer of the same polymer, adherent thereto comprising a polymer member having therein an amount of carbon black within the range of 100 parts to 225 parts per 100 parts of polymer in which the carbon black is mechanically held and a layer of modified natural rubber adherent to the carbon black particles in said second layer and a body to which the said modified rubber layer is also adherent comprising an olefinic emulsion polymer.

6. An article of manufacture comprising a body of a low temperature interpolymer of a major proportion of isobutylene with a minor proportion of isoprene having therein an amount of carbon black less than 100 parts per 100 of polymer, a layer of the same polymer, adherent thereto comprising a member composed of the same polymer having therein an amount of carbon black within the range of 100 parts to 225 parts per 100 parts of polymer in which the carbon black is mechanically held and a layer of modified natural rubber adherent to the carbon black particles in said second layer.

7. An article of manufacture comprising a body of a low temperature interpolymer of a major proportion of isobutylene with a minor proportion of piperylene having therein an amount of carbon black less than 100 parts per 100 of polymer, a layer of the same polymer, adherent thereto comprising a member composed of the same polymer having therein an amount of carbon black within the range of 100 parts to 225 parts per 100 parts of polymer in which the carbon black is mechanically held and a layer of modified natural rubber adherent to the carbon black particles in said second layer.

8. An article of manufacture comprising a body of a low temperature interpolymer of a major proportion of isobutylene with a minor proportion of butadiene having therein an amount of carbon black less than 100 parts per 100 of polymer, a layer of the same polymer, adherent thereto comprising a member composed of the same polymer having therein an amount of carbon black within the range of 100 parts to 225 parts per 100 parts of polymer in which the carbon black is mechanically held and a layer of modified natural rubber adherent to the carbon black particles in said second layer.

9. The method of uniting a low temperature isoolefin-diolefin interpolymer prepared by reacting together a major proportion of isobutylene with a minor proportion of a low molecular weight, aliphatic, conjugated diolefin having 4 to 12, inclusive, carbon atoms per molecule in the presence of a Friedel-Crafts catalyst dissolved in an organic solvent which forms no complex therewith and is liquid at the reaction temperature, the reaction being conducted at a temperature between −40° C. and −160° C.; to another solid body comprising the steps of compounding into the polymer a quantity of carbon black within the range between 100 parts and 225 parts per 100 parts of polymer, holding it therein by mechanical interlocking and applying to projecting portions of the carbon black a modified rubber containing cement which wets the carbon black and is adherent thereto and to another body.

10. The method of uniting a low temperature isoolefin-diolefin interpolymer prepared by reacting together a major proportion of isobutylene with a minor proportion of a low molecular weight, aliphatic, conjugated diolefin having 4 to 12, inclusive, carbon atoms per molecule in the presence of a Friedel-Crafts catalyst dissolved in an organic solvent which forms no complex therewith and is liquid at the reaction temperature, the reaction being conducted at a temperature between −40° C. and −160° C.; to a support comprising the steps of compounding into a portion of the polymer an amount of carbon black between 100 parts and 225 parts per 100 parts of polymer, forming the compound into a tie ply and applying to one surface thereof a layer of modified natural rubber the other side of said natural rubber being adherent to a support.

11. The method of uniting a low temperature isoolefin-diolefin interpolymer prepared by reacting together a major proportion of isobutylene with a minor proportion of a low molecular weight, aliphatic, conjugated diolefin having 4 to 12, inclusive, carbon atoms per molecule in the presence of a Friedel-Crafts catalyst dissolved in an organic solvent which forms no complex therewith and is liquid at the reaction temperature, the reaction being conducted at a temperature between −40° C. and −160° C.; to a metal comprising the steps of compounding into a portion of the polymer an amount of carbon black between 100 parts and 225 parts per 100 parts of polymer, forming the compound into a tie ply and applying to one surface thereof a layer of modified natural rubber, adhering the modified natural rubber to metal and adhering the compounded polymer to another portion of polymer.

12. The method of uniting a low temperature isoolefin-diolefin interpolymer prepared by reacting together a major proportion of isobutylene with a minor proportion of a low molecular weight, aliphatic, conjugated diolefin having 4 to 12, inclusive, carbon atoms per molecule in the presence of a Friedel-Crafts catalyst dissolved in an organic solvent which forms no complex therewith and is liquid at the reaction temperature, the reaction being conducted at a temperature between −40° C. and −160° C.; to a metal comprising the steps of compounding into a portion of the polymer an amount of carbon black between 100 parts and 225 parts per 100 parts of polymer together with a curing agent, forming the compound into a tie ply and applying to one surface thereof a layer of modified natural rubber, the other side of said layer of modified natural rubber being adherent to a metal surface, and thereafter curing the composite article by the application of heat.

13. The method of uniting a low temperature isoolefin-diolefin interpolymer prepared by reacting together a major proportion of isobutylene with a minor proportion of a low molecular weight, aliphatic, conjugated diolefin having 4 to 12, inclusive, carbon atoms per molecule in the presence of a Friedel-Crafts catalyst dissolved in an organic solvent which forms no complex therewith and is liquid at the reaction temperature, the reaction being conducted at a temperature between −40° C. and −160° C.; to a natural rubber comprising the steps of compounding into a portion of the polymer an amount of carbon black between 100 parts and 225 parts per 100 parts of polymer, forming the compound into a tie ply and applying to one surface thereof a layer of modified natural rubber, adhering the modified natural rubber to natural rubber and adhering the compounded polymer to another portion of polymer.

14. The method of uniting a low temperature isoolefin-diolefin interpolymer prepared by reacting together a major proportion of isobutylene with a minor proportion of a low molecular weight, aliphatic, conjugated diolefin having 4 to 12, inclusive, carbon atoms per molecule in the presence of a Friedel-Crafts catalyst dissolved in an organic solvent which forms no complex therewith and is liquid at the reaction temperature, the reaction being conducted at a temperature between $-40°$ C. and $-160°$ C.; to natural rubber comprising the steps of compounding into a portion of the polymer an amount of carbon black between 100 parts and 225 parts per 100 parts of polymer, forming the compound into a tie ply and applying to one surface thereof a layer of modified natural rubber, adhering the modified natural rubber to natural rubber, adhering the compounded polymer to another portion of polymer, and thereafter curing the composite article by the application there of heat and pressure.

FRANCIS P. BALDWIN.

REFERENCES CITED

The following references are of record in the file of this patent:

UNITED STATES PATENTS

| Number | Name | Date |
|---|---|---|
| 2,278,802 | Sarbach | Apr. 7, 1942 |
| 2,311,308 | Thomas | Feb. 16, 1943 |
| 2,316,706 | Muller-Cunradi et al. | Apr. 13, 1943 |
| 2,426,820 | Evans et al. | Sept. 2, 1947 |